(12) United States Patent
Amrhein et al.

(10) Patent No.: US 7,478,372 B2
(45) Date of Patent: Jan. 13, 2009

(54) METHOD FOR OPERATING A COMPUTER SYSTEM

(75) Inventors: Armin Amrhein, Kümmersbruck (DE); Klaus Göbel, Bruchsal (DE); Ulrich Göddemeier, Karlsruhe (DE); Bernhard Jany, Wendelstein (DE); Werner Kuske, Neuenbürg (DE); Thilo Opaterny, Nürnberg (DE); Manfred Prechtl, Schwarzenfeld (DE); Georg Rupprecht, Nürnberg (DE); Dietmar Schulz, Rosstal (DE); Lothar Trapp, Feucht (DE)

(73) Assignee: Siemens Aktiengesellschaft, Munich (DE)

( * ) Notice: Subject to any disclaimer, the term of this patent is extended or adjusted under 35 U.S.C. 154(b) by 545 days.

(21) Appl. No.: 10/493,542

(22) PCT Filed: Oct. 16, 2002

(86) PCT No.: PCT/DE02/03918

§ 371 (c)(1),
(2), (4) Date: Nov. 12, 2004

(87) PCT Pub. No.: WO03/038612

PCT Pub. Date: May 8, 2003

(65) Prior Publication Data

US 2005/0120339 A1     Jun. 2, 2005

(30) Foreign Application Priority Data

Oct. 25, 2001 (DE) .................. 101 52 729

(51) Int. Cl.
*G06F 9/45* (2006.01)
*G06F 9/44* (2006.01)

(52) U.S. Cl. .............. 717/131; 717/124; 717/127; 717/154

(58) Field of Classification Search ............... None
See application file for complete search history.

(56) References Cited

U.S. PATENT DOCUMENTS

| 5,432,937 | A |   | 7/1995 | Tevanian et al. |         |
|-----------|---|---|--------|-----------------|---------|
| 5,604,905 | A | * | 2/1997 | Tevanian et al. | 717/140 |
| 6,049,668 | A | * | 4/2000 | Smith et al.    | 717/138 |

FOREIGN PATENT DOCUMENTS

EP     0 884 678 A2     12/1998

OTHER PUBLICATIONS

Trutz Eyke Podschun: Das Assembler Buch—Grundlagen, Einführung und Hochsprachoptimierung, Mar. 2002, p. 303, line 11-line 32, XP002329656, Addison-Wesley Verlag, München, Germany.
Intel Corporation: "Willamette Processor Software Developer's Guide", online, Feb. 2000, p. 2-28, p. 2-30, paragraph 2.6.1, XP002329655, found in internet: URL: http://developer.intel.com/design/processor/WmtSDG.pdf on May 25, 2005.

(Continued)

Primary Examiner—Chuck O Kendall

(57) ABSTRACT

The invention relates to a method for operating a computer system. The inventive method allows best possible utilization of the efficiency of a concrete target hardware by providing in a program alternative passages of which exactly one is selected for execution by the processor by means of a code.

4 Claims, 3 Drawing Sheets

OTHER PUBLICATIONS

A. Krall, S. Lelait; "Compilation techniques for multimedia processors", Database Inspec "online", The Institution of Electrical Engineers, Stevenage, GB; Aug. 2000, pp. 347-361, ISSN: 0885-7458, p. 354-p. 356, paragraph 5, vol. 28, No. 4, XP002329658, Database accession No. 6719435, abstract & International Journal of Parallel Programming Kluwer Academic/Plenum Publishers, USA.

\* cited by examiner

METHOD FOR OPERATING A COMPUTER SYSTEM

CROSS REFERENCE TO RELATED APPLICATIONS

This application is the US National Stage of International Application No. PCT/DE02/03918, filed Oct. 16, 2002 and claims the benefit thereof. The International Application claims the benefits of German application No. 10152729.2 filed Oct. 25, 2001, both of the applications are incorporated by reference herein in their entirety.

FIELD OF INVENTION

The invention relates to a method for operating a computer system.

BACKGROUND OF INVENTION

Computer systems and the corresponding methods for operating them are generally known. A computer system—or computer for short—features a processor or a corresponding processing unit which is in a position to execute commands in accordance with a defined command set and to initiate the actions corresponding to the commands in each case. Processors and processing units of the above type are referred to in general terms below as processors.

There are processors of the type defined above in various performance classes and with different instruction sets. Whereas each processor will provide commands in some form or another, for adding two numbers for example, the number of commands that are to be executed on a processor to perform such an addition, e.g. an addition of two so-called long numbers, varies widely. If a first processor can address these two long numbers directly and has the corresponding internal registers in which these two long numbers can be buffered, the addition can for example be implemented with one or two processor commands. For another processor the same function can require significantly more processor commands to be executed, e.g. if the addition of the long numbers has to be executed byte-by-byte or word-by-word, so that the addition has to be broken down into individual part additions and finally in a concluding step any possible carry over has to be taken into account. The addition is then performed more quickly—disregarding the clock frequency with which the processor is controlled—on that processor on which fewer processor commands are to be executed.

Software programs which include such additions for example and are to be run on the processor or executed by the processor are currently usually coded using what are known as high-level programming languages. A specific translation program, known as the compiler, takes care of the translation of the commands of the programming language into commands which the processor can execute directly. This makes it clear that a compiler has previously been tailored to the processor concerned on which the compiled program is subsequently to be run.

For compilers which create executable code for the widely used processors from Intel, e.g. processors of type 8088, 8086, 80186, 80286, 80386, 80486, Pentium, etc. it is often possible to select the processors for which the compiler is to create the executable code. If for example executable code for execution on a processor of type 80486 has been created with the compiler, this code also contains those processor commands which distinguish a processor of type 80486 from for example a processor of type 8086. The execution of code optimized in this way for a processor of type 80486 is thereby more efficient than if the compiler had created code for a processor of type 8086 and this code were to be run on a processor of type 80486. To this extent there exists what is known as upwards compatibility between the processors listed above, as can also be found for processors of other well-known processor families. However no downwards compatibility is provided so that a code which was created for a processor of type 80486 cannot be executed on a processor of type 8086, since this code also features processor commands that only a processor of type 80486 is in a position to execute.

A program which has been created can thus not simply be transferred from a first processor onto a second processor with a different range of functions. When the program is transferred to a processor with a smaller range of functions it is under some circumstances not possible to execute the program since the processor with the smaller range of functions cannot execute some instructions contained in the program. When the program is transferred to a processor with a larger range of functions execution of the program is generally safeguarded, however the disadvantage is that the additional performance of the processor cannot be exploited.

What are known as preprocessors are already known from software development, which prepare a source program, source code as an input for the compiler by essentially executing textual expansions or replacements. The preprocessor is a specific software program which is used before the compiler is used. The preprocessor is able to recognize specific elements in the source code on the basis of a unique syntax or on the basis of a unique format. The usual case is for example an application in which the programmer provides instructions in the source code which make it easier to find possible errors during development. In the final program however these instructions should no longer be present. To do this the programmer embeds the corresponding instructions in a preprocessor instructions provided for this purpose, such as #if DEBUG . . . #endif. The result of these is that after the source code has been processed by the preprocessor, the instructions contained between the markers #if and #endif are only still included if the symbol DEBUG was defined. The programmer can thus almost operate a switch by defining a symbol which affects the type and scope of the generated program.

SUMMARY OF INVENTION

The object of the invention is to specify a method with which the disadvantageous situation outlined above can be overcome and that opens up similar flexibility to that of a preprocessor.

In accordance with the invention this object is achieved by a method with the features of claim 1. This initially requires that a computer system—as is generally normal—features a memory and a processor and in addition a code specifying the performance of the computer system and/or the processor.— The performance of the computer system and/or the processor is directly correlated with the relevant scope of functions.—A program specially developed with an engineering system and a filter program are stored in the memory of the computer system.

A further requirement is that the program contains "alternative passages" in which case the code which is contained in the first branch of such an alternative passage gets executed on a processor of a first performance class, code which is contained in the second branch of such an alternative passage gets executed on a processor of a second performance class and code which is contained in the third branch of such an alternative passage gets executed on a processor of a third performance class etc.

Accordingly the program includes "normal" instructions and at least one section with a selection and a reference criterion and at least two alternative passages, in which case each passage contains its own particular instructions. The filter program is provided to generate an executable program from the program already stored in memory. The filter program in this case directly accepts into the executable program each "normal" instruction of the program already stored in memory. If the filter program encounters a section with alternative passages, each instruction is transferred to precisely one passage of this section in accordance with the selection and reference criterion of this section and the code in the executable program.

The invention operates here on the assumption that the programmer provides in the relevant program not only the code for a processor of a first performance class, but also code for a processor of a second and a third and possibly further performance classes and as regards execution by the processor embeds this into alternative passages in suitable structures, on the basis of which at least the beginning and the end of each alternative passage can be detected. Then, when the generated code is executed, it is established at the beginning of such an alternative passage on the basis of the code, which performance class the relevant processor and/or computer system offers and the appropriate alternative passage is selected for this performance class, so that the processor commands which the processor can actually execute get executed, but the executed processor commands use as much as possible of the specific capabilities of the actual processor.

It is also possible for the compiler to create such alternative passages itself, if it has access to the relevant scheme for each processor class for transforming specific commands and instructions of a higher-level programming language in each case into a code that can be executed by the relevant processor. An example of such an arrangement is an addition which occurs in a program which is expressed in the programming language as "a =b +c", but can be implemented in different ways depending on the processor. Then the compiler creates a separate alternative passage for each implementation, which is selected for execution of the program on a specific processor on the basis of its actual capabilities.

The advantage of the invention lies in the fact that the only processor commands which get executed are those which the relevant processor can actually execute and simultaneously that with the processor commands executed, the best possible use is made of the specific capabilities of the actual processor.

The dependent claims are directed to preferred embodiments of the present invention.

Advantageously there is provision for the filter program to execute the program in portions, in that with "normal" instructions one instruction after the other is read out of the program and is transferred into the executable program and in that, for a section, in accordance with the selection and reference criterion of the section as well as the code, the beginning and the end of precisely one passage is determined and each instruction of the passage is read out successively and transferred into the executable program.

Alternatively there is advantageous provision for the filter program to execute the program in portions in that with "normal" instructions one instruction after the other is read out of the program and is transferred into the executable program and in that, for a section in accordance with the selection and reference criterion of the section as well as the code, the beginning of precisely one passage is determined and until a data item identifying the end of the passage is reached, each instruction of the passage is read out successively and transferred into the executable program.

BRIEF DESCRIPTION OF THE DRAWINGS

An exemplary embodiment of the invention is explained in more detail below on the basis of the drawing. Parts of the drawing which correspond to each other are given the same reference number in each diagram.

The drawings show
FIG. 1 a computer system,
FIG. 2a a program with alternative passages and
FIG. 2b an executable program derived from this.

DETAILED DESCRIPTION OF INVENTION

Figure 1:
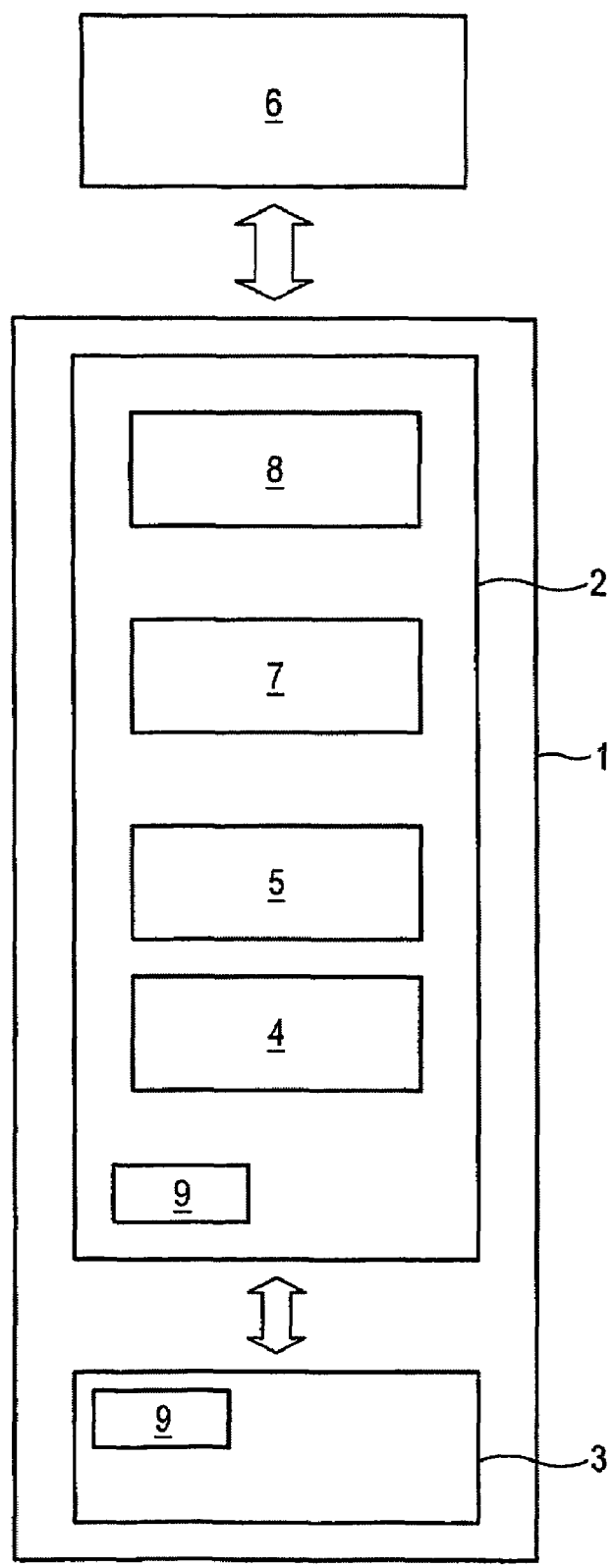

FIG 1 shows a schematic diagram of a computer system 1 with a memory 2 and a processor 3. In the memory 2 are stored an operating system 4 and a filter program 5. An engineering system 6 is provided for creation of a program 7 also loaded into memory 2. The filter program 5 creates from the program 7 executable program 8 which can be run by processor 3. The engineering system 6 is for example a programming device with engineering software that can be executed on it which offers at least the functionality of an editor and that of a compiler or of a compiler and a linker.

A code 9 is stored in memory 2 and/or in processor 3 with which the performance of processor 3 and/or of computer system 1 is specified. Identifier 9 has a value of "1" for example, if processor 3 or computer system 1 can only execute programs which require functionality in accordance with a first performance class. Accordingly code 9 has a value of "2" for example if processor 3 or computer system 1 can execute programs which require a functionality corresponding to a second performance class etc.

Figure 2A:
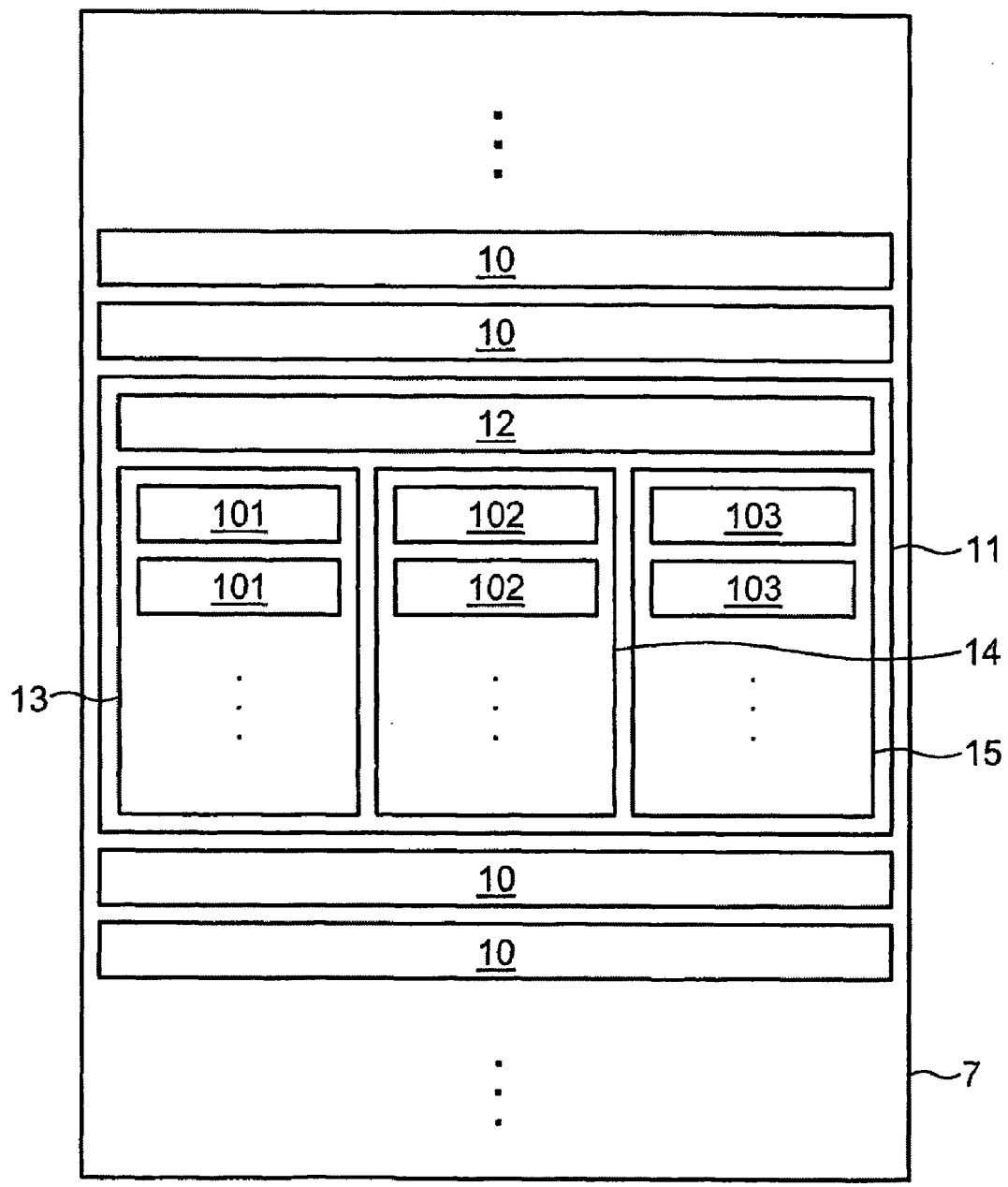
Figure 2B:
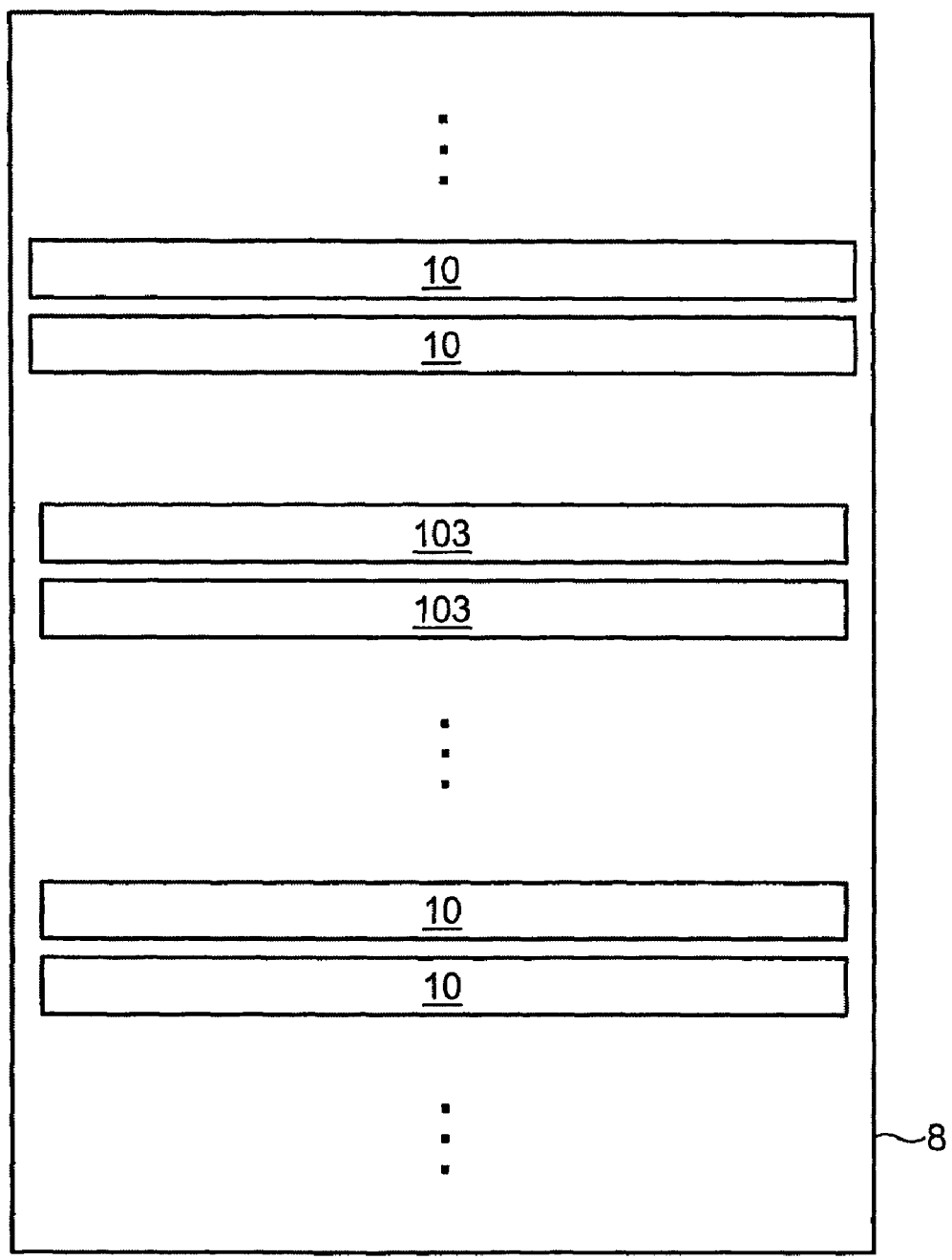

The creation of the executable program 8 from program 7 is explained on the basis of FIGS. 2a and 2b.

FIG. 2a shows a section of program 7 with instructions 10 contained in it. Instructions 10 can be executed by processor 3. At a specific point program 7 contains a section 11 which comprises a selection and reference criterion 12 as well as at least two alternative passages 13, 14, 15. Each passage 13, 14, 15 in its turn comprises instructions 101, 102, 103. The instructions 101 of the first alternative passage 13 correspond, as regards the functionality that they trigger, the instructions 102, 103 of the second or third alternative passage. The instructions 101, 102, 103 themselves may however differ in this case, since namely in alternative passage 13 for example such instructions 101 are contained that a processor 3 or a computer system 1 of a first performance class can execute. Accordingly the second and third alternative passage 14, 15 contains such instructions 102, 103 that a processor 3 or a computer system 1 of a second or third performance class can execute.

After section 11 the program 7 is continued with instructions 10. Further down in program 7 there can be a further section 11 which in its turn contains alternative passages. The number of alternative passages in a specific section 11 is exclusively dependent on how many alternative passages the programmer has provided for the relevant section.

FIG. 2b shows the executable program 8 which was created with the filter program 5 from the program 7. The executable program 8, just like program 7, contains instructions 10. The instructions 10 shown in FIG. 2a also correspond to those which are shown in FIG. 2b. The instructions 10 are thus transferred unchanged by filter program 5 from program 7 into executable program 8. If filter program 5 detects a selection and reference criterion 12, depending on the value of the code 9 one of the alternative passages 13, 14, 15 with the instructions 101, 102, 103 that it contains is transferred into the executable program. FIG. 2b shows the arrangement where the value of the code 9 has led to the selection of the third alternative passage 15. According the instructions 103 contained in this passage 15 are transferred into the executable program.

The executable program can now be executed on computer system 1 by processor 3. When this is done it is ensured that the performance of computer systems 1 and its processor 3 are exploited to the best possible degree. If the same program 7 is loaded onto a computer system 1 for which the code has a lower value, its filter program 5, instead of for example the instructions 103 from the third alternative passage, the filter program transfers the instructions 102 from the second alternative passage into the executable program 8. This means that program 7 can be executed on different computer systems without manual intervention with guaranteed optimum use always being made of the performance of computer system 1 and processor 3.

An alternative of equal value in many respects of the method in accordance with the invention consists of not converting program 7 into an executable program 8 by a filter program, but of undertaking this conversion at runtime by the processor 3 itself. From the structure information, which in accordance with the previously described implementation of the method in accordance with the invention at least delimits the alternative passages 13, 14, 15 from each other, commands which can be executed directly by processor 3 are formed. The selection and reference criterion 12 is accordingly replaced by a number of branch instructions tailored to the number of alternative passages 13, 14, 15, so that on execution of program 7 there is a direct branch in accordance with code 9 to the beginning of the relevant passage 13, 14, 15. At the end of a passage 13, 14, 15 selected in this way subsequent further passages 13, 14, 15 are skipped if necessary, in that the processing of program 7 is continued at the end of section 10 with the alternative passages 13, 14, 15. Slight speed overheads during the execution of program 7 caused by the interrogation of code 9 at runtime are compensated for by the fact that program 7 only has to be stored once on computer system 1 and that program 7 can be transferred directly from the computer system to another computer system 1 and can be executed there.

Thus the invention can be briefly presented as follows:

The method in accordance with the invention provides the option of making the best possible use of the actual destination hardware 1, 3 in that alternative passages 13, 14, 15 are provided in a program 7 of which precisely one is selected for execution by the processor 3 on the basis of a code 9.

The invention claimed is:

1. A method for operating a computer system having a memory, a processor, and a code specifying the performance of the computer system and/or the processor, the method comprising:

storing a first program and in the memory, and storing a filter program in the memory to compile the first program into executable code, wherein the first program includes instructions and at least one section with a selection and reference criterion and at least two alternate passages having instructions; and generating the executable code from the first program with the filter program, wherein;

instructions of only one of the at least two alternate passages are selected and converted into object code in accord with the selection and reference criterion of the section relative to the code specifying the performance of the computer system and/or the processor so that performance of the computer system and the processor when executing the first program are exploited to the best possible degree.

2. A method in accordance with claim 1, wherein the filter program executes the first program in sections, and wherein with instructions one instruction after the other is read out of the first program and transferred into the executable program, and wherein with a section, according to a selection and reference criterion of the section and the code the beginning and end of precisely one passage is determined and each instruction of the passage is successively read and transferred into the executable program.

3. A method according to claim 1, wherein the filter program executes the first program in sections, wherein with instructions one instruction after the other is read out of the program and transferred into the executable program, and wherein with a section, according to a selection and reference criterion of the section and the code the beginning of precisely one passage is determined and, until a data item identifying the end of the passage is reached, each instruction of the passage is successively read and transferred into the executable program.

4. A method according to claim 1, wherein the program is created with an engineering system.

\* \* \* \* \*